(No Model.)
H. VERING.
FLEXIBLE PIPE CONNECTION.
No. 428,186. Patented May 20, 1890.
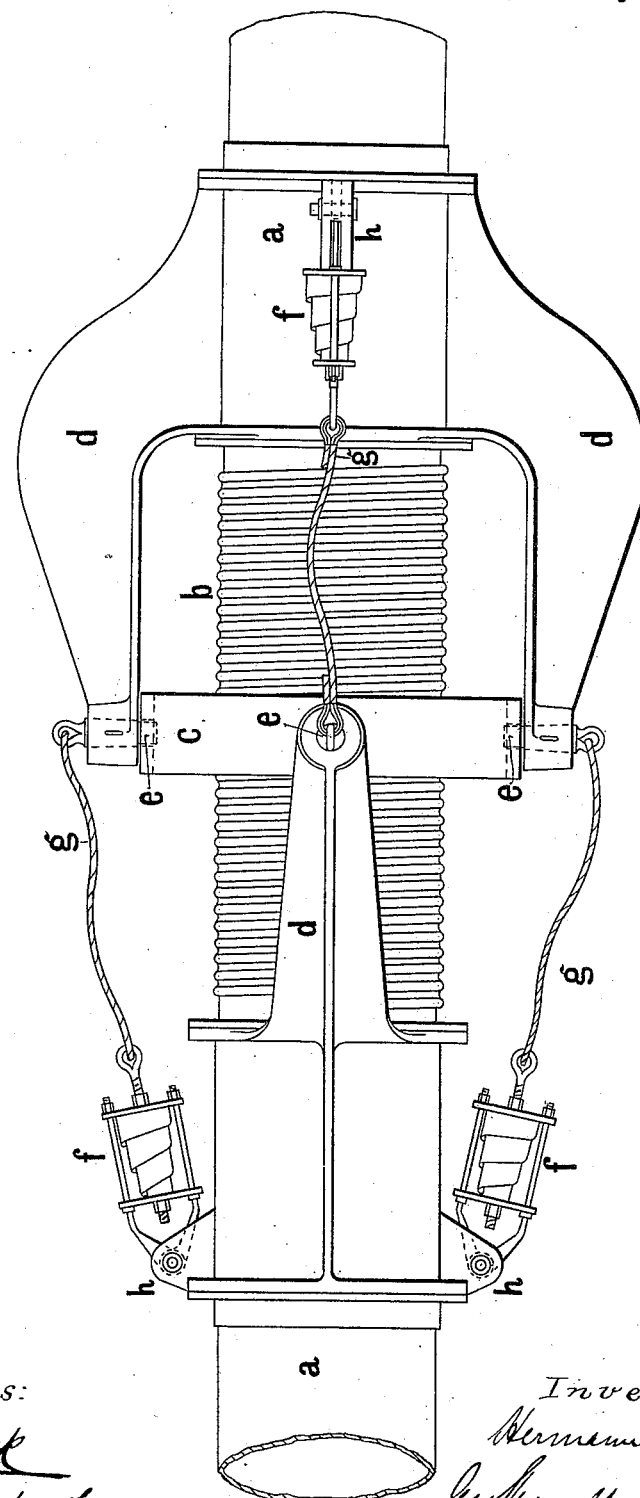
Witnesses:
Inventor:
Hermann Vering

UNITED STATES PATENT OFFICE.

HERMANN VERING, OF HAMBURG, GERMANY.

FLEXIBLE PIPE-CONNECTION.

SPECIFICATION forming part of Letters Patent No. 428,186, dated May 20, 1890.

Application filed April 23, 1889. Serial No. 308,311. (No model.)

*To all whom it may concern:*

Be it known that I, HERMANN VERING, a citizen of the State of Hamburg, residing at Hamburg, German Empire, have invented new and useful Improvements in Flexible Pipe-Connections, whereof the following is a specification.

My invention relates to flexible connections between two metal or other rigid pipes, the said connections consisting in a hose of leather, india-rubber, or other suitable material; and its object is to make such connections more resistant against irregular strains, to render the pipes capable of being rotated by a force applied to one of them, and to prevent the connections from being bent to an injurious extent. For this purpose I combine with the said hose a universal joint consisting of two pairs of arms fastened to the respective pipes, so as to be directed toward each other, and of a ring encircling the hose with sufficient play and pivoted at four points to the said arms. Besides this, each arm of one pipe is connected to the other pipe by a rope or chain having such length as to limit the bending of the hose. For preventing shocks from occurring in the said ropes or chains springs, india-rubber cushions, or other resilient media may be combined therewith.

In the annexed drawing a pipe-connection carried out according to my invention is shown in an outside view.

$a$ $a$ are the two metal pipes, and $b$ is the hose which unites them. To each pipe are fixed two arms $d$, and these arms are connected together by the ring $c$ and four pivots $e$, so that the arms form with the ring a universal joint. Each arm $d$ is connected to a lug $h$ on the opposite pipe $a$ by a rope $g$ and a spring $f$, the parts $g$ and $f$ having together such length as to prevent the hose from being bent more than is desired.

The pipes provided with the said connections are especially designed to be used with dredgers for the conveyance of the dredged material by means of a current of water, and in case the pipes are kept floating on water in which there is any wave motion or which is exposed to changing tidal-currents.

I claim as my invention—

1. A flexible pipe-connection consisting of two pipes $a$, each having two arms $d$, directed toward each other, an intermediate flexible pipe portion $b$, and a ring $c$, encircling the hose and connecting said arms by means of pivots $e$, substantially as and for the purposes hereinbefore set forth.

2. A flexible pipe-connection consisting of two pipes $a$, provided with two arms $d$, projecting toward each other, an intermediate flexible pipe portion $b$, ring $c$, encircling the hose, pivots $e$, located upon said ring and forming a universal joint between said arms and ring, and the ropes $g$, connecting each arm of one pipe to the other pipe, substantially as and for the purposes specified.

3. A flexible pipe-connection consisting of two pipes $a$, provided with two arms $d$, projecting toward each other, an intermediate flexible pipe portion $b$, ring $c$, encircling the hose, pivots $e$, placed upon said ring and forming between said arms and ring a universal joint, and ropes $g$, combined with springs $f$ and connecting each arm of one pipe to the other pipe to prevent shocks or jarring, substantially as set forth.

In testimony whereof I have hereunto set my hand in the presence of two subscribing witnesses.

HERMANN VERING.

Witnesses:
CHAS. H. BURKE,
A. ALVORO.